(12) United States Patent
Lee

(10) Patent No.: US 11,150,504 B2
(45) Date of Patent: Oct. 19, 2021

(54) COLOR CONVERSION PANEL AND DISPLAY DEVICE INCLUDING THE SAME

(71) Applicant: SAMSUNG DISPLAY CO., LTD., Yongin-si (KR)

(72) Inventor: Kyung-Hun Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/715,512

(22) Filed: Dec. 16, 2019

(65) Prior Publication Data

US 2020/0117043 A1    Apr. 16, 2020

Related U.S. Application Data

(63) Continuation of application No. 15/952,733, filed on Apr. 13, 2018, now Pat. No. 10,509,253.

(30) Foreign Application Priority Data

Sep. 12, 2017 (KR) .................. 10-2017-0116531

(51) Int. Cl.
  *G02F 1/1335*    (2006.01)
  *G02F 1/13357*    (2006.01)
  *G02F 1/1368*    (2006.01)

(52) U.S. Cl.
  CPC .. *G02F 1/133504* (2013.01); *G02F 1/133512* (2013.01); *G02F 1/133514* (2013.01);
  (Continued)

(58) Field of Classification Search
  CPC .... G02F 1/1333; G02F 1/1335; G02F 1/1336; G02F 1/1338; G02F 1/133617; G02F 1/133514; G02F 1/133606; G02F 1/133512; G02F 1/133605; G02F 1/133553; G02F 1/133504; G02F 1/133509; G02F 2001/133614; G02F 2001/133357;
  (Continued)

(56) References Cited

U.S. PATENT DOCUMENTS 9,528,685 B2    12/2016 Kadowaki
10,509,253 B2 *    12/2019 Lee .................. G02F 1/133514
(Continued)

FOREIGN PATENT DOCUMENTS

JP    2016224434    12/2016
KR    1020150061968    6/2015
(Continued)

*Primary Examiner* — Thoi V Duong
(74) *Attorney, Agent, or Firm* — F. Chau & Associates, LLC

(57) ABSTRACT

A color conversion panel includes a substrate. A first color conversion layer, a second color conversion layer, and a transmission layer are provided on the substrate. A first scatterer layer is provided between the first color conversion layer and the second color conversion layer. A second scatterer layer is provided between the second color conversion layer and the transmission layer. A light filter layer is provided between the first scatterer layer and the first color conversion layer, between the first scatterer layer and the second color conversion layer, between the second scatterer layer and the second color conversion layer, and between the second scatterer layer and the transmission layer.

8 Claims, 17 Drawing Sheets

(52) U.S. Cl.
CPC .. *G02F 1/133553* (2013.01); *G02F 1/133614* (2021.01); *G02F 1/133617* (2013.01); *G02F 1/1368* (2013.01)

(58) Field of Classification Search
CPC ........... G02F 2203/055; G02F 2201/08; G02F 2201/52; G02F 2201/34; G02F 2202/046; G02F 1/133614; G02F 1/133357; H01L 27/322; H01L 33/502; H01L 33/60; H01L 33/50; H01L 2251/5376
See application file for complete search history.

(56) References Cited

U.S. PATENT DOCUMENTS

| | | | |
|---|---|---|---|
| 2015/0124188 A1* | 5/2015 | Kadowaki | ......... G02F 1/133514 349/42 |
| 2019/0079341 A1 | 3/2019 | Lee | |

FOREIGN PATENT DOCUMENTS

| | | |
|---|---|---|
| KR | 1020170026822 | 3/2017 |
| KR | 1020170027276 | 3/2017 |

* cited by examiner

COLOR CONVERSION PANEL AND DISPLAY DEVICE INCLUDING THE SAME

CROSS-REFERENCE TO RELATED APPLICATION

This application is a continuation of U.S. application Ser. No. 15/952,733, filed on Apr. 13, 2018, which claims priority to Korean Patent Application No. 10-2017-0116531 filed in the Korean Intellectual Property Office on Sep. 12, 2017, the disclosures of which are incorporated by reference herein in their entirety.

TECHNICAL FIELD

Exemplary embodiments of the present invention relate to a color conversion panel, and more particularly to a display device including the same.

DISCUSSION OF RELATED ART

A liquid crystal display used as a display device may include two field generating electrodes, a liquid crystal layer, a color filter, and a polarizer. The polarizer and the color filter of the liquid crystal display may lose light. A liquid crystal display including a color conversion layer may reduce a loss of light and increase efficiency of a display device.

SUMMARY

A color conversion panel according to an exemplary embodiment of the present invention reduces color mixture and increases light outputting efficiency in a display device including the same.

A color conversion panel according to an exemplary embodiment of the present invention includes a substrate. A first color conversion layer, a second color conversion layer, and a transmission layer are provided on the substrate. A first scatterer layer is provided between the first color conversion layer and the second color conversion layer. A second scatterer layer is provided between the second color conversion layer and the transmission layer. A light filter layer is provided between the first scatterer layer and the first color conversion layer, between the first scatterer layer and the second color conversion layer, between the second scatterer layer and the second color conversion layer, and between the second scatterer layer and the transmission layer.

The color conversion panel may include a reflection layer provided between at least one of the first or second scatterer layers and at least one of the first color conversion layer, the second color conversion layer, or the transmission layer.

The reflection layer may be provided on at least one side of the first color conversion layer, the second color conversion layer, or the transmission layer. The reflection layer need not be provided on an upper side of the first color conversion layer, the second color conversion layer, or the transmission layer opposite the substrate.

The color conversion panel may include an inner light filter layer provided between the reflection layer and at least one of the first color conversion layer, the second color conversion layer, or the transmission layer.

The color conversion panel may include a blue light cutting filter provided on the substrate, and overlapping the first color conversion layer and the second color conversion layer along a direction orthogonal to an upper surface of the substrate.

The scatterer layer may include at least one of $TiO_2$, $ZrO_2$, $HfO_2$, $Ta_2O_5$, $Y_2O_3$, or ZnO.

A color conversion panel according to an exemplary embodiment of the present invention includes a substrate. A first color conversion layer, a second color conversion layer, and a transmission layer are provided on the substrate. A light filter layer is provided on the first color conversion layer, the second color conversion layer, and the transmission layer. An inner scattering layer is provided on at least one of between the first color conversion layer and the light filter layer, between the second color conversion layer and the light filter layer, or between the transmission layer and the light filter layer.

The color conversion panel may include an inner light filter layer provided on the inner scattering layer.

The color conversion panel may include a reflection layer provided on the inner scattering layer.

The color conversion panel may include a first scatterer layer provided between the first color conversion layer and the second color conversion layer, and a second scatterer layer provided between the second color conversion layer and the transmission layer.

The inner scattering layer may include at least one of $TiO_2$, $ZrO_2$, $HfO_2$, $Ta_2O_5$, $Y_2O_3$, or ZnO.

A color conversion panel according to an exemplary embodiment of the present invention includes a substrate. A first color conversion layer, a second color conversion layer, and a transmission layer are provided on the substrate. A first scatterer layer is provided between the first color conversion layer and the second color conversion layer. A second scatterer layer is provided between the second color conversion layer and the transmission layer.

The color conversion panel may include a light filter layer. The light filter layer may include a horizontal unit and a vertical unit. The horizontal unit may be in direct contact with the first color conversion layer, the second color conversion layer, and the transmission layer. The vertical unit may be provided between the first color conversion layer and the second color conversion layer, and between the second color conversion layer and the transmission layer. Opposite sides of the vertical unit may be in direct contact with one of the first scatterer layer or the second scatterer layer.

According to an exemplary embodiment of the present invention, a display device includes a display panel, and a color conversion panel provided on the display panel. The color conversion panel includes a substrate. A first color conversion layer, a second color conversion layer, and a transmission layer are provided on the substrate. A first scatterer layer is provided between the first color conversion layer and the second color conversion layer, and a second scatterer layer is provided between the second color conversion layer and the transmission layer. A light filter layer is provided between the first scatterer layer and the first color conversion layer, between the first scatterer layer and the second color conversion layer, between the second scatterer layer and the second color conversion layer, and between the second scatterer layer and the transmission layer.

The display device may include a reflection layer provided between at least one of the first or second scatterer layers and at least one of the first color conversion layer, the second color conversion layer, or the transmission layer.

The reflection layer may be provided on at least one side of the first color conversion layer, the second color conversion layer, or the transmission layer. The reflection layer need not be provided on an upper side of the at least one of the first color conversion layer, the second color conversion layer, or the transmission layer opposite the substrate.

The display device may include an inner light filter layer provided between the reflection layer and the first color conversion layer, between the reflection layer and the second color conversion layer, or between the reflection layer and the transmission layer.

The display device may include an inner scattering layer provided between the first color conversion layer and the light filter layer, between the second color conversion layer and the light filter layer, or between the transmission layer and the light filter layer.

According to an exemplary embodiment of the present invention, the color conversion panel may include the substrate. The first color conversion layer, the second color conversion layer, and the transmission layer may be positioned above the substrate. Each of the first color conversion layer, the second color conversion layer, and the transmission layer may have angled sidewalls with respect an upper surface of the substrate. The blue light cutting filter may be disposed on the substrate between the first color conversion layer and the substrate, and between the second color conversion layer and the substrate. The light filter layer may be disposed on the angled sidewalls of each of the first color conversion layer, the second color conversion layer, and the transmission layer. The first scatterer layer may be positioned between the first color conversion layer and the second color conversion layer. The second scatterer layer may be positioned between the second color conversion layer and the transmission layer.

According to an exemplary embodiment of the present invention, the mixture of colors of the color conversion panel is recued or prevented, thus increasing display quality and increasing light outputting efficiency of a display device.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENTS

Figure 1:
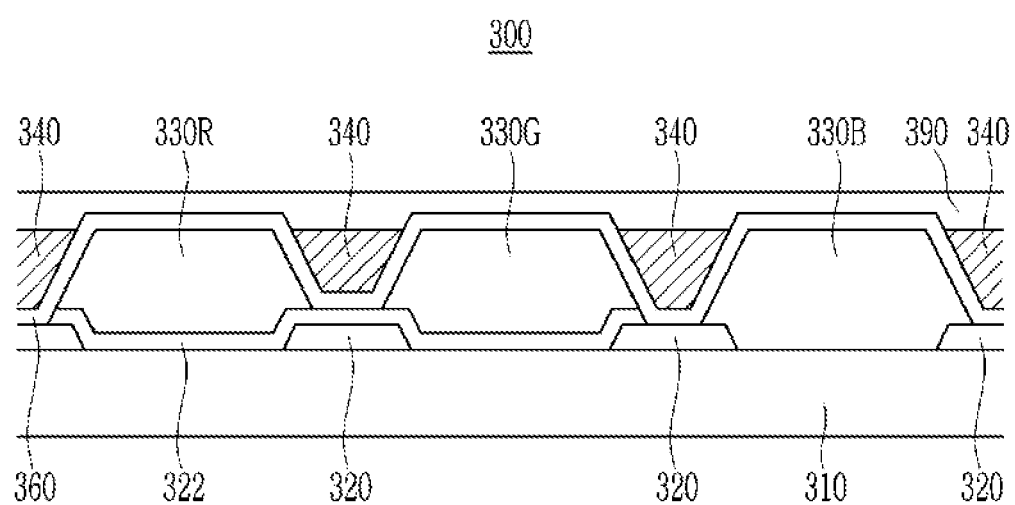
FIG. 1 is a cross-sectional view of a color conversion panel according to an exemplary embodiment of the present invention.

Exemplary embodiments of the present invention will be described below in more detail with reference to the accompanying drawings. In this regard, the exemplary embodiments may have different forms and should not be construed as being limited to the exemplary embodiments of the present invention described herein.

Like reference numerals may refer to like elements throughout the specification and drawings.

Sizes of elements in the drawings may be exaggerated for clarity of description.

It will be understood that when a component, such as a layer, a film, a region, or a plate, is referred to as being "on" another component, the component may be directly on the other component or intervening components may be present.

The phrases "on a plane" or "a plan view" mean viewing the object portion from the top, and the phrases "on a cross-section" or "a cross-sectional view" mean viewing a cross-section of which the object portion is vertically cut and illustrated from the side.

A color conversion panel according to an exemplary embodiment of the present invention will be described in more detail below with reference to FIG. 1.

FIG. 1 is a cross-sectional view of a color conversion panel according to an exemplary embodiment of the present invention.

Referring to FIG. 1, a color conversion panel 300 may include a substrate 310, a first color conversion layer 330R, a second color conversion layer 330G, a transmission layer 330B, and a scatterer layer 340. The first color conversion layer 330R the second color conversion layer 330G, and the transmission layer 330B may be arranged on the substrate. For example, the first color conversion layer 330R, the second color conversion layer 330G, and the transmission layer 330B may be arranged on the substrate 310 along a direction parallel to an upper surface of the substrate 310. However, the order of arrangement of the first color conversion layer 330R, the second color conversion layer 330G, and the transmission layer 330B is not limited to a particular order.

The scatterer layer 340 may be provided between the first color conversion layer 330R and the second color conversion layer 330G, and between the second color conversion layer 330G and the transmission layer 330B. Thus, at least one scatterer layer 340 (e.g., two scatterer layers 340) may be provided between the transmission layer 330B and the first color conversion layer 330R. The scatterer layers 340 may separate the first color conversion layer 330R, the second color conversion layer 330G, and the transmission layer 330B from each other along the direction parallel to the upper surface of the substrate 310. The color conversion layers 330R and 330G of the color conversion panel 300 may convert incident blue light into red light or green light, respectively, and the transmission layer 330B transmits incident blue light.

The scatterer layer 340 may include a scatterer, and it may include at least one of zirconium oxide ($ZrO_2$), hafnium oxide ($HfO_2$), tantalum oxide ($Ta_2O_5$), titanium oxide ($TiO_2$), yttrium oxide ($Y_2O_3$), or zinc oxide (ZnO).

The scatterer layer 340 may scatter light emitted by the first color conversion layer 330R, the second color conversion layer 330G, or the transmission layer 330B to prevent the light from being transmitted to a neighboring color conversion layer or a transmission layer. As an example, part of light emitted by the color conversion layer may be transmitted to a side of the color conversion layer (e.g., toward a neighboring color conversion layer, which may emit a different color light), and thus light transmitted to a side of the color conversion layer may be transmitted to a neighboring color conversion layer and may cause a mixture of colors and may reduce light outputting efficiency. However, the scatterer layer 340 scatters the light that proceeds in a straight line (e.g., a straight line towards a neighboring color conversion layer) in various directions, and thus the scatterer layer 340 may reduce or prevent light from being transmitted to a neighboring color conversion layer or a transmission layer. Thus, the mixture of colors by the first color conversion layer 330R, the second color conversion layer 330G, and the transmission layer 330B respectively emitting different colors may be reduced or eliminated. The scatterer layer 340 will be described in more detail below.

Referring to FIG. 1, a light blocking layer 320 may be provided between the scatterer layer 340 and the substrate 310. As an example, the light blocking layer 320 may be in direct contact with the substrate 310. However, exemplary embodiments of the present invention are not limited thereto. For example, the light blocking layer 320 need not contact the substrate 310 and it may be provided between the first color conversion layer 330R and the second color conversion layer 330G, between the second color conversion layer 330G and the transmission layer 330B, while being spaced apart from the substrate. Thus, at least one light blocking layer 320 (e.g., two light blocking layers 320) may be positioned between the transmission layer 330B and the first color conversion layer 330R, while being spaced apart from the substrate.

In an exemplary embodiment of the present invention, the first color conversion layer 330R may convert supplied blue light into red light. The first color conversion layer 330R may include a red phosphor, and the red phosphor may be at least one material of (Ca, Sr, Ba)S, (Ca, Sr, Ba)$_2$Si$_5$N$_8$, (CaAlSiN$_3$), CaMoO$_4$, or Eu$_2$Si$_5$N$_8$. Further, the first color conversion layer 330R may include a quantum dot. The quantum dot may convert incident blue light into red light.

The second color conversion layer 330G may convert the supplied blue light into green light. The second color conversion layer 330G may include a green phosphor, and the green phosphor may be at least one material of yttrium aluminum garnet (YAG), (Ca, Sr, Ba)$_2$SiO$_4$, SrGa$_2$S$_4$, BAM, α-SiAlON, β-SiAlON, Ca$_3$Sc$_2$Si$_3$O$_{12}$, Tb$_3$Al$_5$O$_{12}$, BaSiO$_4$, CaAlSiON, or (Sr$_{1-x}$Ba$_x$)Si$_2$O$_2$N$_2$. Here, the x may be a number between 0 and 1. Further, the second color conversion layer 330G may include a quantum dot. The quantum dot may convert incident blue light into green light.

The transmission layer 330B transmits the incident blue light. The transmission layer may include a transparent polymer, and the supplied blue light may be transmitted therethrough to display the blue color. The transmission layer 330B corresponding to a region for outputting blue light includes a material for outputting the incident blue light without an additional phosphor or quantum dot, and it may include a scatterer.

A blue light cutting filter 322 may be provided between the first color conversion layer 330R and the substrate 310 and between the second color conversion layer 330G and the substrate 310. Referring to FIG. 1, the blue light cutting filter 322 may be a single layer overlapping the first color conversion layer 330R and the second color conversion layer 330G (e.g., along a direction orthogonal to an upper surface of the substrate 310). The blue light cutting filter 322 may be a single layer overlapping the first color conversion layer 330R and the second color conversion layer 330G, respectively (e.g., along the direction orthogonal to the upper surface of the substrate 310).

The blue light cutting filter 322 may be a mixture of one of BiO$_2$, ZnO, or Ce$_2$O$_3$ and one of CaCO$_3$, ZrO$_2$, TiO, or Ar$_2$O$_3$; however, exemplary embodiments of the present invention are not limited thereto. For example, the blue light cutting filter 322 may include another material for blocking blue light.

The blue light cutting filter 322 absorbs light in a wavelength band of from about 400 nm to about 500 nm, and thus the blue light with this wavelength band is blocked. Thus, transmittance of the blue light cutting filter 322 is equal to or less than about 5% in the wavelength of 450 nm, it is equal to or greater than about 80% in the wavelength of 535 nm, and it is equal to or greater than about 90% in the wavelength of 650 nm.

Thus, the blue light cutting filter 322 prevents mixture of colors when the blue light passes through the first color conversion layer 330R and the second color conversion layer 330G to realize the red color (R) and the green color (G).

Referring to FIG. 1, the color conversion panel 300 may include a light filter layer 360 provided on the first color conversion layer 330R, the second color conversion layer 330G, and the transmission layer 330B. The light filter layer 360 may have a structure in which a layer with a low refractive index and a layer with a high refractive index are stacked. The light filter layer 360 may efficiently supply incident light, and it may be omitted depending on an exemplary embodiment of the present invention.

The color conversion panel 300 may include a planarization layer 390 provided on the scatterer layer 340 and the light filter layer 360. The planarization layer 390 may eliminate a manufacturing step caused by different heights of the scatterer layer 340, the first color conversion layer 330R, the second color conversion layer 330G, and the transmission layer 330B, while providing a planar surface on an upper surface of the planarization layer 390. The planarization layer 390 may be omitted depending on an exemplary embodiment of the present invention.

According to another exemplary embodiment of the present invention, the color conversion panel 300 may include the substrate 310. The first color conversion layer 330R, the second color conversion layer 330G, and the transmission layer 330B may be positioned above the substrate 310. Each of the first color conversion layer 330R, the second color conversion layer 330G, and the transmission layer 330B may have angled sidewalk with respect an upper surface of the substrate 310. The blue light cutting filter 322 may be disposed on the substrate 310 between the first color conversion layer 330R and the substrate 310, and between the second color conversion layer 330G and the substrate 310. The light filter layer 360 may be disposed on the angled sidewalk of each of the first color conversion layer 330R, the second color conversion layer 330G, and the transmission layer 330B. The first scatterer layer 340 may be positioned between the first color conversion layer 330R and the second color conversion layer 330G. The second scatterer layer 340 may be positioned between the second color conversion layer 330G and the transmission layer 330B.

A color conversion panel according to an exemplary embodiment of the present invention will now be described with reference to FIG. 2.

Figure 2:
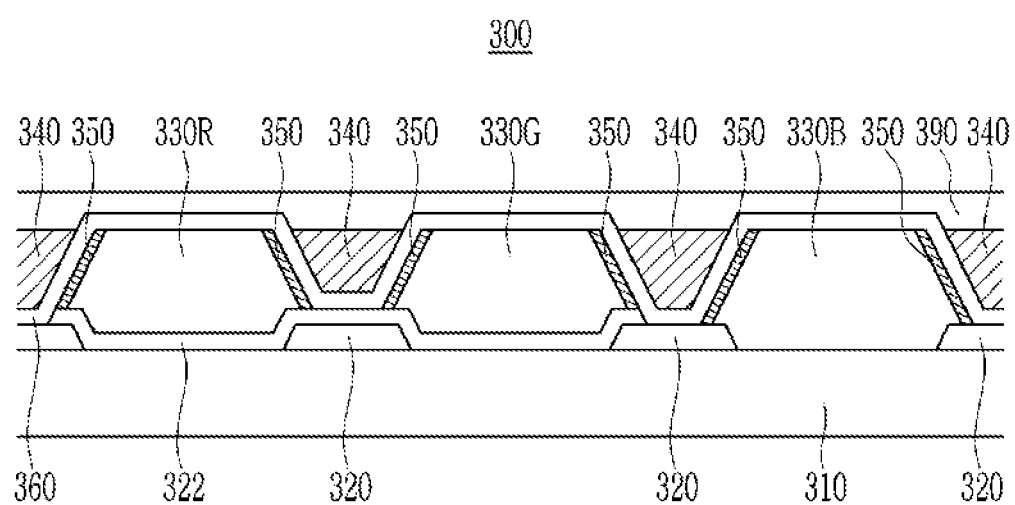
FIG. 2 is a cross-sectional view of a color conversion panel according to an exemplary embodiment of the present invention.

FIG. 2 is a cross-sectional view of a color conversion panel according to an exemplary embodiment of the present invention.

The color conversion panel described with reference to FIG. 2 is similar to the color conversion panel described with reference to FIG. 1. Thus, descriptions of constituent elements that are the same or substantially similar to those described above with reference to FIG. 1, may be omitted below.

Referring to FIG. 2, the color conversion panel 300 may include a reflection layer 350 provided between the scatterer layer 340 and at least one of the first color conversion layer 330R, the second color conversion layer 330G, or the transmission layer 330B. The reflection layer 350 may include a reflecting metal, and may reflect light output in the direction of the reflection layer 350 in the directions of the color conversion layers 330R and 330G and the transmission layer 330B to increase an amount of light output to a user.

A part of the light passing through the reflection layer 350 without being reflected from the reflection layer 350 may be scattered by a scatterer on the scatterer layer 340, and thus the light might not be directed into the color conversion layer or the transmission layer. Further, when part of the scattered light proceeds in the direction of the neighboring color conversion layer or the transmission layer, it is reflected at the reflection layer 350 provided on the neighboring color conversion layer or the transmission layer and does not enter the neighboring color conversion layer or the transmission layer.

The reflection layer 350 may be provided on the first color conversion layer 330R, the second color conversion layer 330G, and the transmission layer 330B. Alternatively, the reflection layer 350 may be provided on less than all of the first color conversion layer 330R, the second color conversion layer 330G, and the transmission layer 330B. For example, the reflection layer 350 may be provided only on the transmission layer 330B. The transmission layer 330B allows the incident blue light to transmit through, so the blue light may pass again through the transmission layer 330B compared to the first color conversion layer 330R or the second color conversion layer 330G for converting blue light into light of a different wavelength and outputting the resultant light. Thus, when the reflection layer 350 is provided on the transmission layer 330B, the amount of the output blue light may be increased.

Thus, the reflection layer 350 may be in direct contact with at least one side from among the sides of the first color conversion layer 330R, the second color conversion layer 330G, or the transmission layer 330R, and it need not be in direct contact with an upper side of the first color conversion layer 330R, the second color conversion layer 330G, or the transmission layer 330B opposite the substrate 310. If the reflection layer 350 is in direct contact with a substantial portion of the upper side of the first color conversion layer 330R, the second color conversion layer 330G, or the transmission layer 330B, it may reflect the incident blue light so that the blue light is not input into the color conversion layer or the transmission layer.

A color conversion panel according to an exemplary embodiment of the present invention will be described in more detail below with reference to FIG. 3.

Figure 3:
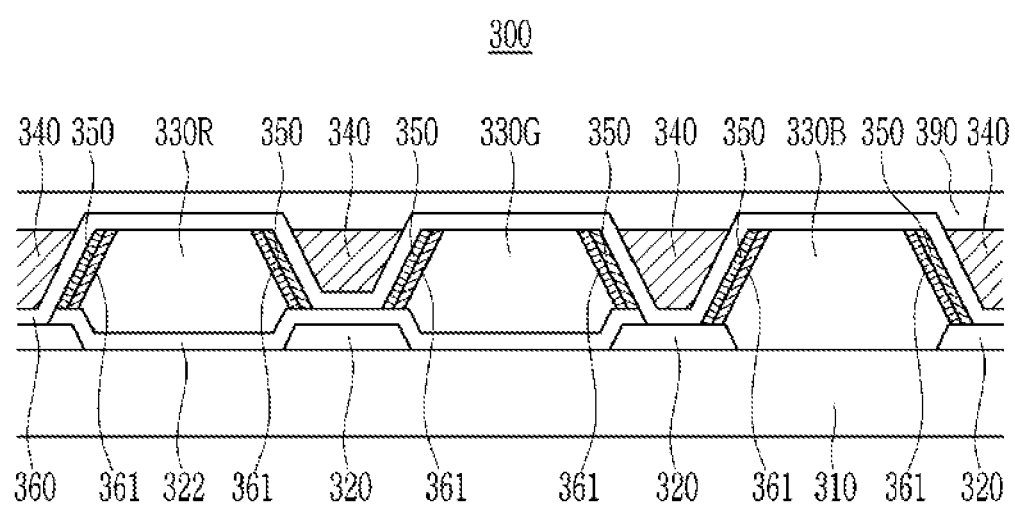
FIG. 3 is a cross-sectional view of a color conversion panel according to an exemplary embodiment of the present invention.

FIG. 3 is a cross-sectional view of a color conversion panel according to an exemplary embodiment of the present invention.

The color conversion panel according to an exemplary embodiment of the present invention described with reference to FIG. 3 is similar to the color conversion panel described with reference to FIG. 2. Thus, descriptions of constituent elements that are the same or substantially similar to those described above with reference to FIG. 2 may be omitted below.

Referring to FIG. 3, the color conversion panel 300 according to an exemplary embodiment of the present invention may include an inner light filter layer 361 provided between the reflection layer 350 and the first color conversion layer 330R, between the reflection layer 350 and the second color conversion layer 330G, and/or between the reflection layer 350 and the transmission layer 330B.

The inner light filter layer 361 may include a same material as that of the light filter layer 360. For example, the inner light filter layer 361 may have a structure in which a layer with a low refractive index and a layer with a high refractive index are stacked. The inner light filter layer 361 may supply incident light relatively efficiently in a like manner to the light filter layer 360, and it may induce total reflection of light on an interface of the inner light filter layer 361 to increase the amount of output light.

A color conversion panel according to an exemplary embodiment of the present invention will be described in more detail below with reference to FIG. 4.

Figure 4:
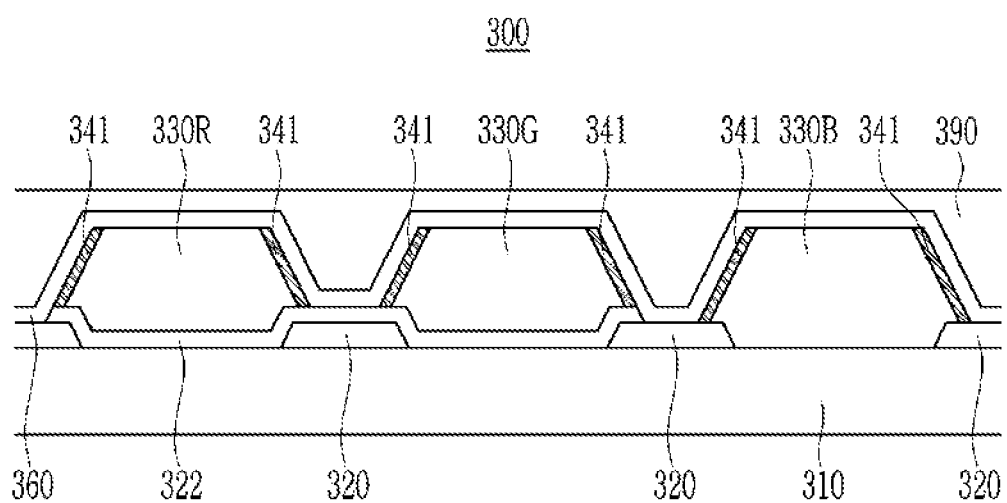
FIG. 4 is a cross-sectional view of a color conversion panel according to an exemplary embodiment of the present invention.

FIG. 4 is a cross-sectional view of a color conversion panel according to an exemplary embodiment of the present invention.

The color conversion panel 300 described with reference to FIG. 4 is similar to the color conversion panel according to an exemplary embodiment of the present invention described with reference to FIG. 1 except that an inner scattering layer 341 is provided instead of the scatterer layer 340. Thus, descriptions of constituent elements that are the same or substantially similar to those described above with reference to FIG. 1 may be omitted below.

Referring to FIG. 4, the color conversion panel 300 according to an exemplary embodiment of the present invention may include the inner scattering layer 341 in direct contact with at least one side of the first color conversion layer 330R, the second color conversion layer 330G, or the transmission layer 330B. The color conversion panel 300 described with reference to FIG. 4 might not include a scatterer layer.

As an example, the inner scattering layer 341 may be provided in at least one of between the light filter layer 360 and the first color conversion layer 330R, between the light filter layer 360 and the second color conversion layer 330G, or between the light filter layer 360 and the transmission layer 330B.

The inner scattering layer 341 may have a film form including a scatterer. The inner scattering layer 341 may include at least one of zirconium oxide ($ZrO_2$), hafnium oxide ($HfO_2$), tantalum oxide ($Ta_2O_5$), titanium oxide ($TiO_2$), yttrium oxide ($Y_2O_3$), or zinc oxide (ZnO).

Similar to the scatterer layer 340 according to an exemplary embodiment of the present invention described with reference to FIG. 1, the inner scattering layer 341 scatters the light emitted by the first color conversion layer 330R, the second color conversion layer 330G, or the transmission layer 330B, which may prevent the light from being input to a neighboring color conversion layer or a transmission layer. Therefore, mixture of colors among the first color conversion layer 330R, the second color conversion layer 330G, and the transmission layer 330B for converting/transmitting different colors may be prevented. However, according to an exemplary embodiment of the present invention, the inner scattering layer 341 is provided between the light filter layer 360 and the first color conversion layer 330R, between the light filter layer 360 and the second color conversion layer 330G, or between the light filter layer 360 and the transmission layer 330B, and thus the light scattered by the inner scattering layer 341 is filtered by the light filter layer 360 and the mixture of colors may be reduced or prevented. In addition, the efficiency of output light may be increased.

A color conversion panel according to an exemplary embodiment of the present invention will be described in more detail below with reference to FIG. 5.

Figure 5:
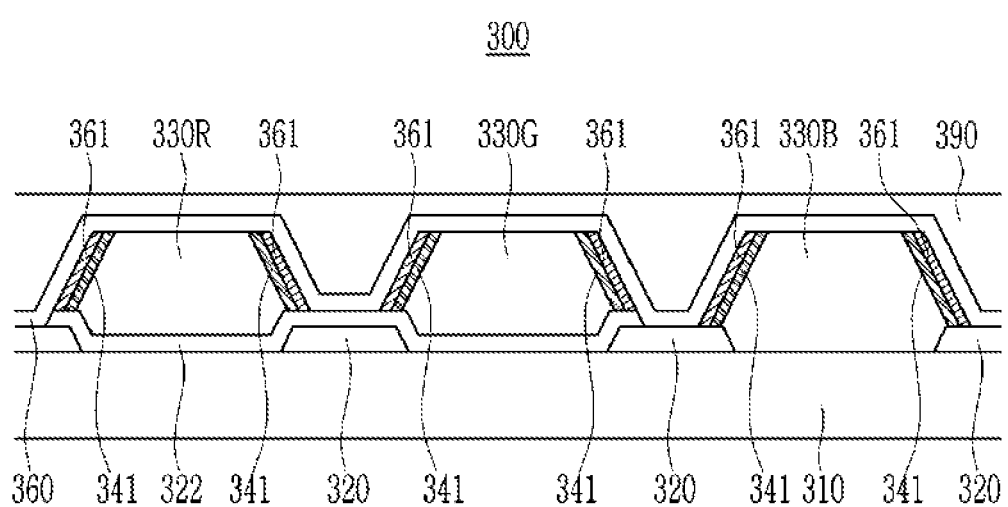
FIG. 5 is a cross-sectional view of a color conversion panel according to an exemplary embodiment of the present invention.

FIG. 5 is a cross-sectional view of a color conversion panel according to an exemplary embodiment of the present invention.

The color conversion panel 300 described with reference to FIG. 5 is similar to the color conversion panel described with reference to FIG. 4 except that the color conversion panel 300 described with reference to FIG. 5 includes an inner light filter layer 361. Thus, descriptions of constituent elements that are the same or substantially similar to those described above with reference to FIG. 4 may be omitted below.

Referring to FIG. 5, the inner light filter layer 361 may be provided between the inner scattering layer 341 and the light filter layer 360. The inner light filter layer 361 may totally reflect the light scattered by the inner scattering layer 341 to an inside of the first color conversion layer 330R, the second color conversion layer 330G or the transmission layer 330B. Therefore, the efficiency of the output light may be increased and purity of the output light may be increased.

A color conversion panel according to an exemplary embodiment of the present invention will be described in more detail below with reference to FIG. 6.

Figure 6:
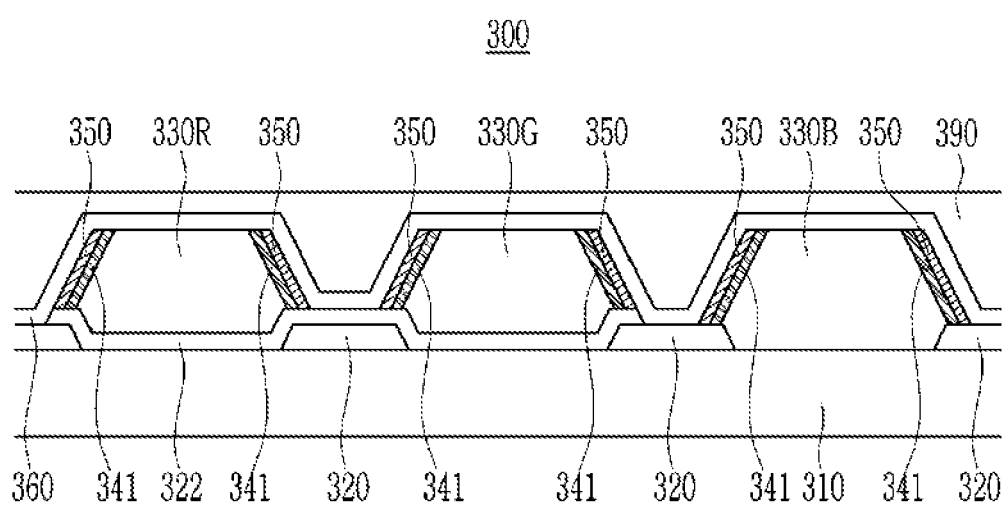
FIG. 6 is a cross-sectional view of a color conversion panel according to an exemplary embodiment of the present invention.

FIG. 6 is a cross-sectional view of a color conversion panel according to an exemplary embodiment of the present invention.

The color conversion panel 300 described with reference to FIG. 6 is similar to the color conversion panel described with reference to FIG. 5 except that the color conversion panel 300 described with reference to FIG. 6 includes the reflection layer 350 instead of the inner light filter layer 361. Thus, descriptions of constituent elements that are the same or substantially similar to those described above with reference to FIG. 5 may be omitted below.

Referring to FIG. 6, the reflection layer 350 may be provided between the inner scattering layer 341 and the light filter layer 360. Therefore, the light scattered by the inner scattering layer 341 may be reflected by the reflection layer 350. Thus, the light color-converted by the color conversion layer or transmitted by the transmission layer may be prevented from being input to the neighboring color conversion layer or the transmission layer, and the light may be reflected to the color conversion layer or the transmission layer direction, thus increasing the amount of light output to the user.

A color conversion panel according to an exemplary embodiment of the present invention will be described in more detail below with reference to FIG. 7.

Figure 7:
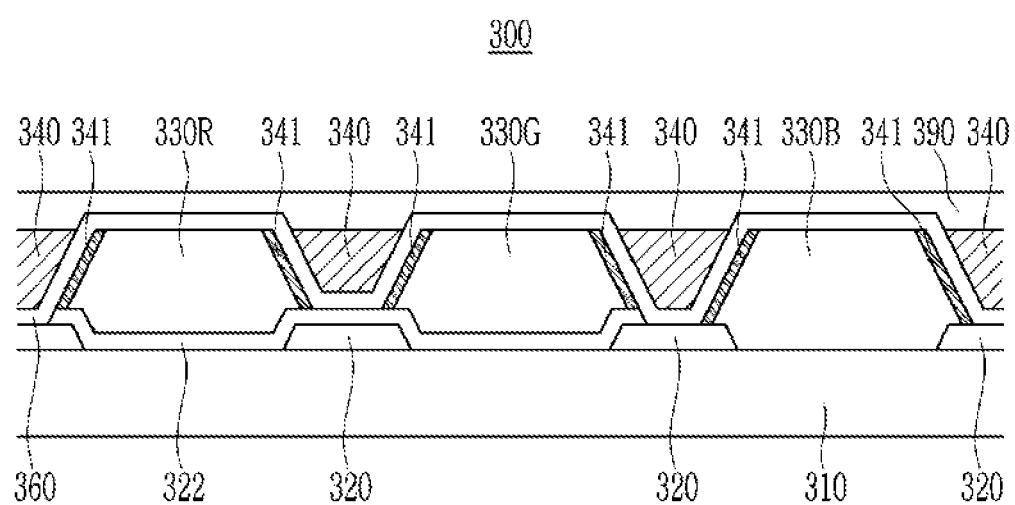
FIG. 7 is a cross-sectional view of a color conversion panel according to an exemplary embodiment of the present invention.

FIG. 7 is a cross-sectional view of a color conversion panel according to an exemplary embodiment of the present invention.

The color conversion panel 300 according to an exemplary embodiment of the present invention described with reference to FIG. 7 is similar to the color conversion panel described with reference to FIG. 4 except that the color conversion panel 300 described with reference to FIG. 7 includes the scatterer layer 340 provided between the first color conversion layer 330R and the second color conversion layer 330G, between the second color conversion layer 330G and the transmission layer 330B, and between the transmission layer 330B and the first color conversion layer 330R. Thus, descriptions of constituent elements that are the same or substantially similar to those described above with reference to FIG. 4 may be omitted below.

Referring to FIG. 7, the color conversion panel 300 according to an exemplary embodiment of the present invention may include the scatterer layer 340 and the inner scattering layer 341. For example, the scatterer layer 340 may be provided between the first color conversion layer 330R and the second color conversion layer 330G, between the second color conversion layer 330G and the transmission layer 330B. Thus, at least one scatterer layer 340 (e.g., two scatterer layers) may be positioned between the transmission layer 330B and the first color conversion layer 330R. The inner scattering layer 341 may be provided between the first color conversion layer 330R and the light filter layer 360, between the second color conversion layer 330G and the light filter layer 360, and between the transmission layer 330B and the light filter layer 360.

Therefore, the light color-converted by one color conversion layer or input to one transmission layer may be scattered by the inner scattering layer 341 provided near the color conversion layers 330R and 330G or the transmission layer 330B, and might not be transmitted to neighboring color conversion layers 330R and 330G or the transmission layer 330B. Further, light directed toward the neighboring color conversion layers 330R and 330G or the transmission layer 330B may be scattered by the scatterer layer 340 provided among the first color conversion layer 330R, the second color conversion layer 330G, or the transmission layer 330B, thus reducing or preventing a mixture of colors.

The color conversion panel 300 according to an exemplary embodiment of the present invention will be described in more detail below with reference to FIG. 8.

Figure 8:
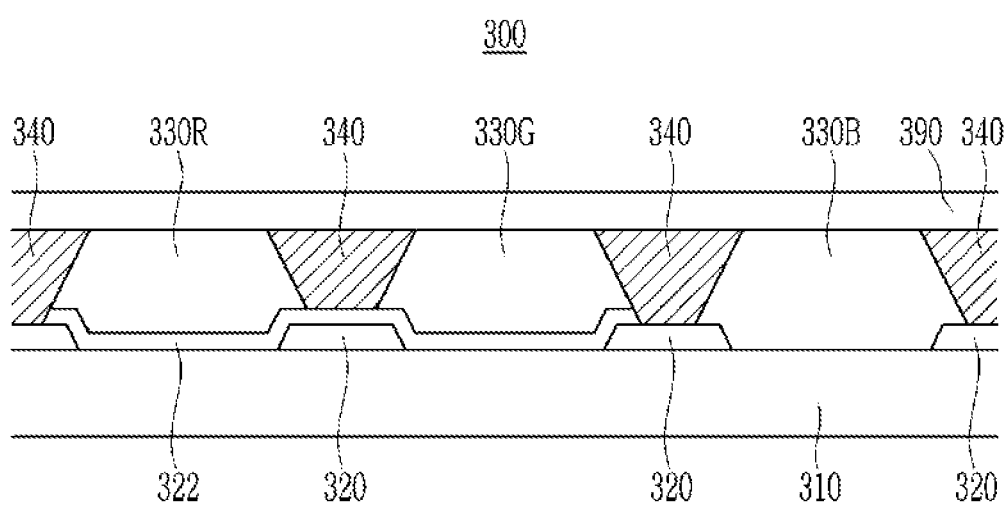
FIG. 8 is a cross-sectional view of a color conversion panel according to an exemplary embodiment of the present invention.

FIG. 8 is a cross-sectional view of a color conversion panel according to an exemplary embodiment of the present invention.

The color conversion panel 300 described with reference to FIG. 8 is similar to the color conversion panel described with reference to FIG. 1 except that it might not include the light filter layer 360. Thus, descriptions of constituent elements that are the same or substantially similar to those described above with reference to FIG. 1 may be omitted below.

Referring to FIG. 8, the color conversion panel 300 according to an exemplary embodiment of the present invention might not include the light filter layer 360, and thus the scatterer layer 340 may be provided between the first color conversion layer 330R and the second color conversion layer 330G, between the second color conversion layer 330G and the transmission layer 330B, and between the transmission layer 330B and the first color conversion layer 330R. Scatterer layers 340 may be in direct contact with the color conversion layers 330R and 330G and the transmission layer 330B. The light filter layer 360 may be omitted. Thus simplifying a structure and reducing manufacturing costs of the color conversion panel 300 according to an exemplary embodiment of the present invention.

A color conversion panel according to an exemplary embodiment of the present invention will be described in more detail below with reference to FIG. 9.

Figure 9:
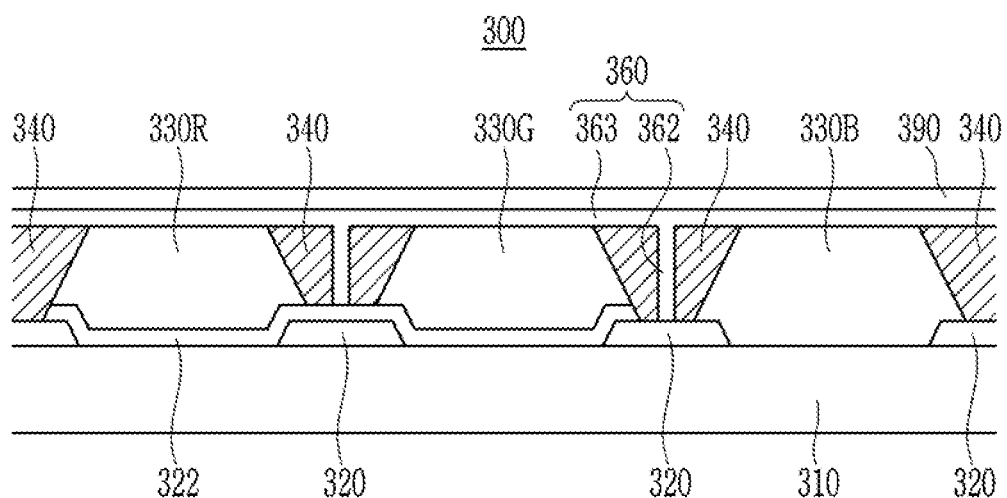
FIG. 9 is a cross-sectional view of a color conversion panel according to an exemplary embodiment of the present invention.

FIG. 9 is a cross-sectional view of a color conversion panel according to an exemplary embodiment of the present invention.

The color conversion panel 300 described with reference to FIG. 9 is similar to the color conversion panel described with reference to FIG. 1 except for the form of the light filter layer 360. Thus, descriptions of constituent elements that are the same or substantially similar to those described above with reference to FIG. 1 may be omitted below.

Referring to FIG. 9, regarding the color conversion panel 300 according to an exemplary embodiment of the present invention, the light filter layer 360 may be provided between the scatterer layers 340. As an example, the light filter layer 360 may include a horizontal unit 363 in direct contact with the color conversion layers 330R and 330G or the transmission layer 330B, and a vertical unit 362 extending in a vertical direction with respect to the substrate from the horizontal unit 363. Therefore, the vertical unit 362 might not be in direct contact with the color conversion layers 330R and 330G or the transmission layer 330B, but may be in direct contact with the scatterer layer 340. For example, the scatterer layer 340 and the vertical unit 362 of the light filter layer 360 may be provided between the first color conversion layer 330R and the second color conversion layer 330G, between the second color conversion layer 330G and the transmission layer 330B, and between the transmission layer 330B and the first color conversion layer 330R. Thus, the mixture of colors among the neighboring color conversion layers 330R and 330G and the transmission layer 330B may be reduced or prevented.

Figure 10:
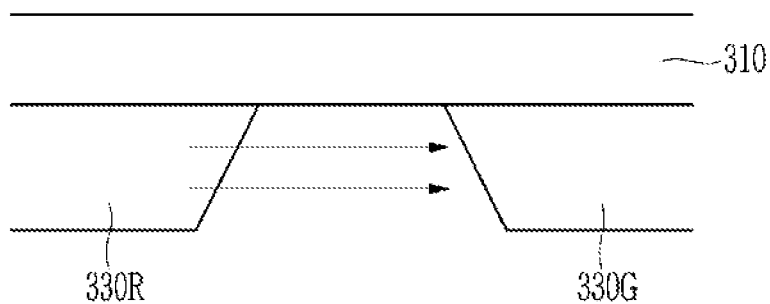
FIG. 10 and FIG. 11 illustrate a principle of light scattering in a scatterer and preventing a mixture of colors according to an exemplary embodiment of the present invention.
Figure 11:
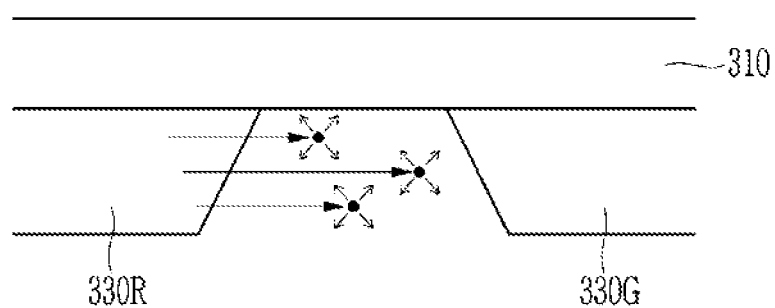

FIG. 10 and FIG. 11 illustrate a principle of light scattering in a scatterer and preventing a mixture of colors according to an exemplary embodiment of the present invention. FIG. 10 shows progress of light when there is no scatterer, and FIG. 11 shows progress of light when there is a scatterer.

Referring to FIG. 10, when there is no scatterer, the light color-converted by the first color conversion layer 330R may travel along a straight line path in a direction of the second color conversion layer 330G. As light has a feature of linearity, part of light output in various directions by the first color conversion layer 330R may be directed along a straight line path to the second color conversion layer 330G.

However, referring to FIG. 11, the scatterer provided between the first color conversion layer 330R and the second color conversion layer 330G scatters the light traveling along the straight line path to the second color conversion layer 330G from the first color conversion layer 330R. For example, the light going straight bumps into the scatterer so it is scattered in various directions, and thus the amount of light reaching the second color conversion layer 330G is reduced.

Therefore, the color conversion panel including a scatterer layer or an inner scattering layer according to an exemplary embodiment of the present invention may prevent the mixture of colors between the neighboring color conversion layers or transmission layers.

The scatterer layer (e.g., scatterer layer 340) according to an exemplary embodiment of the present invention will be described in more detail below with reference to FIG. 12 to FIG. 14.

Figure 12:
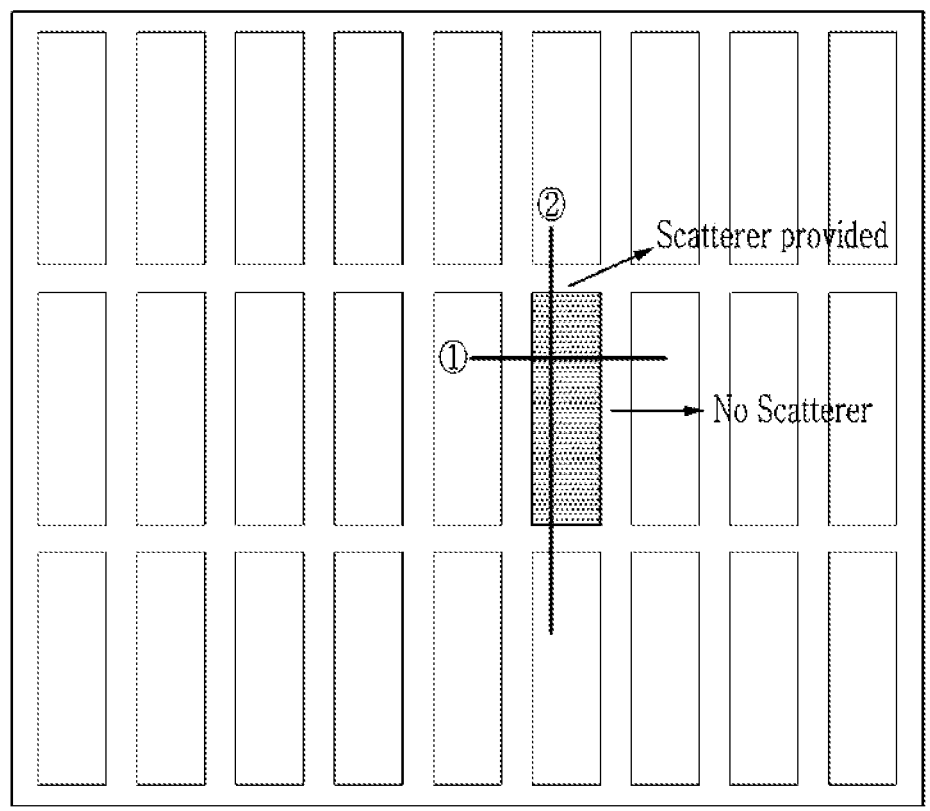
FIG. 12 to FIG. 14 illustrate exemplary changes of luminance of a neighboring pixel when there is no scatterer and when there is a scatterer.
Figure 13:
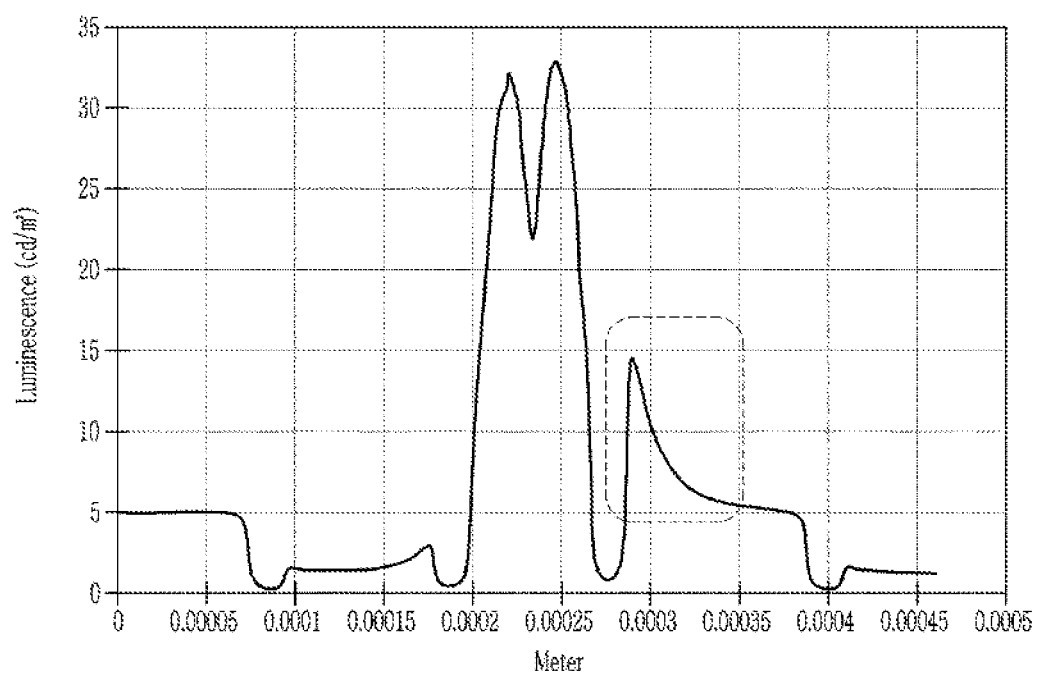
Figure 14:
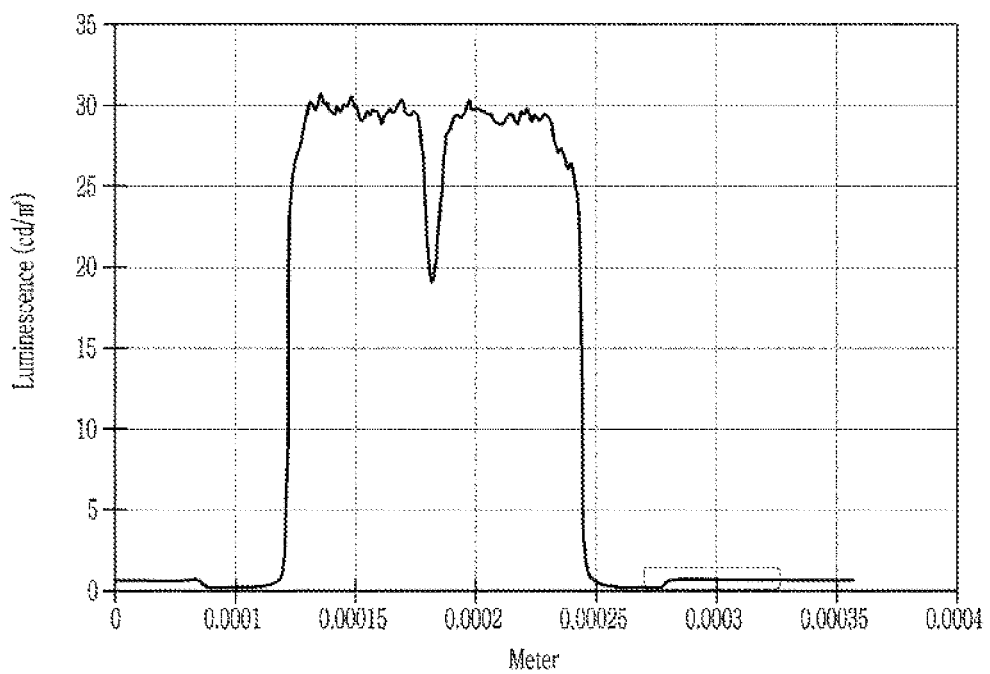

FIG. 12 to FIG. 14 illustrate exemplary changes of luminance of a neighboring pixel when there is no scatterer and when there is a scatterer.

Referring to FIG. 12, a scatterer is not included between pixels in the horizontal direction (1), and the scatterer is included between pixels in the vertical direction (2). A voltage may be applied to marked pixels, luminance may be measured, and exemplary values are illustrated in FIG. 13 and FIG. 14.

FIG. 13 illustrates exemplary luminance of pixels neighboring each other in the horizontal direction. Referring to FIG. 13, a luminance indicated with a rectangular region of FIG. 13 is a neighboring pixel to which no voltage is applied, and FIG. 13 illustrates a luminance in the rectangular region. Thus, FIG. 13 illustrates that light generated by the pixel to which the voltage is applied is input to the neighboring pixel. For example, in the case of FIG. 13, the scatterer is not included between the pixels, so luminance is observed from the pixel to which no voltage is applied, which causes a mixture of colors.

FIG. 14 illustrates exemplary luminance of pixels neighboring each other in the vertical direction. Referring to FIG. 12, a scatterer is provided between the pixels neighboring each other in the vertical direction. The luminance indicated with a rectangular region of FIG. 14 is the neighboring pixel to which no voltage is applied, and FIG. 14 illustrates that no luminance is observed. Thus, the scatterer provided between the pixels prevents light from being input by the neighboring pixel.

According to an exemplary embodiment of the present invention, the color conversion panel including the scatterer layer may be provided between the neighboring first color conversion layer 330R and the second color conversion layer 330G, between the second color conversion layer 330G and the transmission layer 330B, and between the transmission layer 330B and the first color conversion layer 330R. The inner scattering layer 341 may be provided on at least one side between the first color conversion layer 330R and the light filter layer 360, between the second color conversion layer 330G and the light filter layer 360, and between the transmission layer 330B and the light filter layer 360. Thus, the mixture of colors between the neighboring color conversion layers or the transmission layers may be prevented. Additionally, a reflection layer or a light filter layer according to an exemplary embodiment of the present invention may increase light outputting efficiency.

A display device including the color conversion panel according to an exemplary embodiment of the present invention will be described in more detail below. However, exemplary embodiments of the present invention area not limited to the structures described below. Thus, the color conversion panel according to an exemplary embodiment of the present invention is applicable to display devices with various structures.

Figure 15:
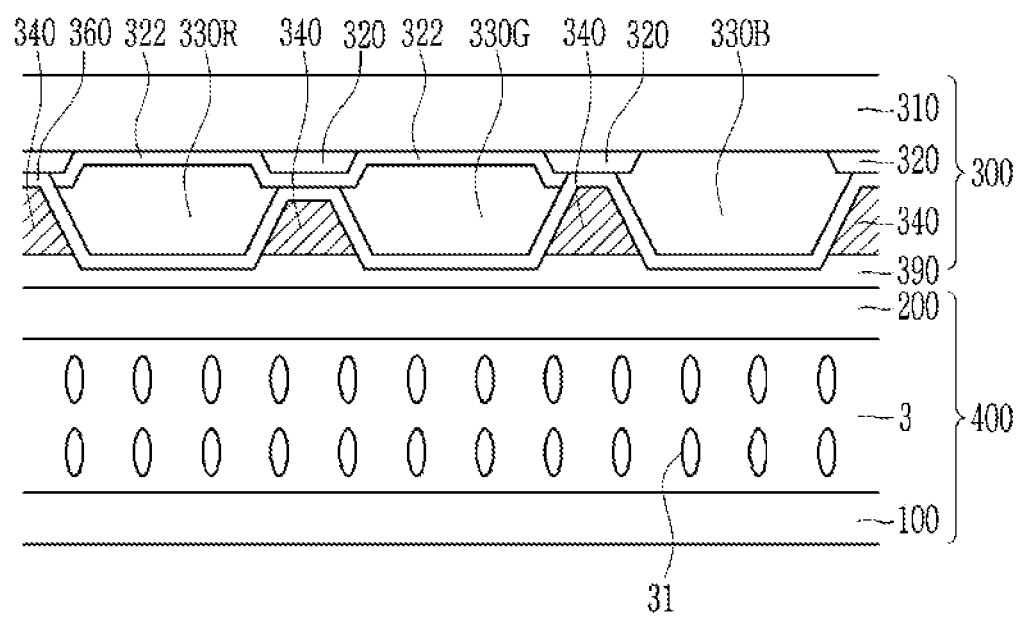
FIG. 15 is a cross-sectional view of a display device including a color conversion panel according to an exemplary embodiment of the present invention.

FIG. 15 is a cross-sectional view of a display device including a color conversion panel according to art exemplary embodiment of the present invention.

Referring to FIG. 15, the display device may include a display panel 400 and the color conversion panel 300. The display panel 400 may include a first display panel 100, a second display panel 200 overlapping the first display panel 100 (e.g., along a direction orthogonal to an upper surface of the first display panel 100), and a liquid crystal layer 3 provided between the first display panel 100 and the second display panel 200 and including liquid crystal molecules 31. However, exemplary embodiments of the present invention are not limited thereto, and the display panel 400 may include one substrate. As an example, the display panel 400 may be an emissive display device including no liquid crystal.

The color conversion panel 300 may be one of the color conversion panels 300 described in more detail above with reference to FIG. 1 to FIG. 9. As an example, FIG. 15 illustrates a color conversion panel 300 as described above with reference to FIG. 1, but exemplary embodiments of the present invention are not limited thereto.

A display device including a color conversion panel according to an exemplary embodiment of the present invention will be described in more detail below with reference to FIGS. 16 and 17.

Figure 16:
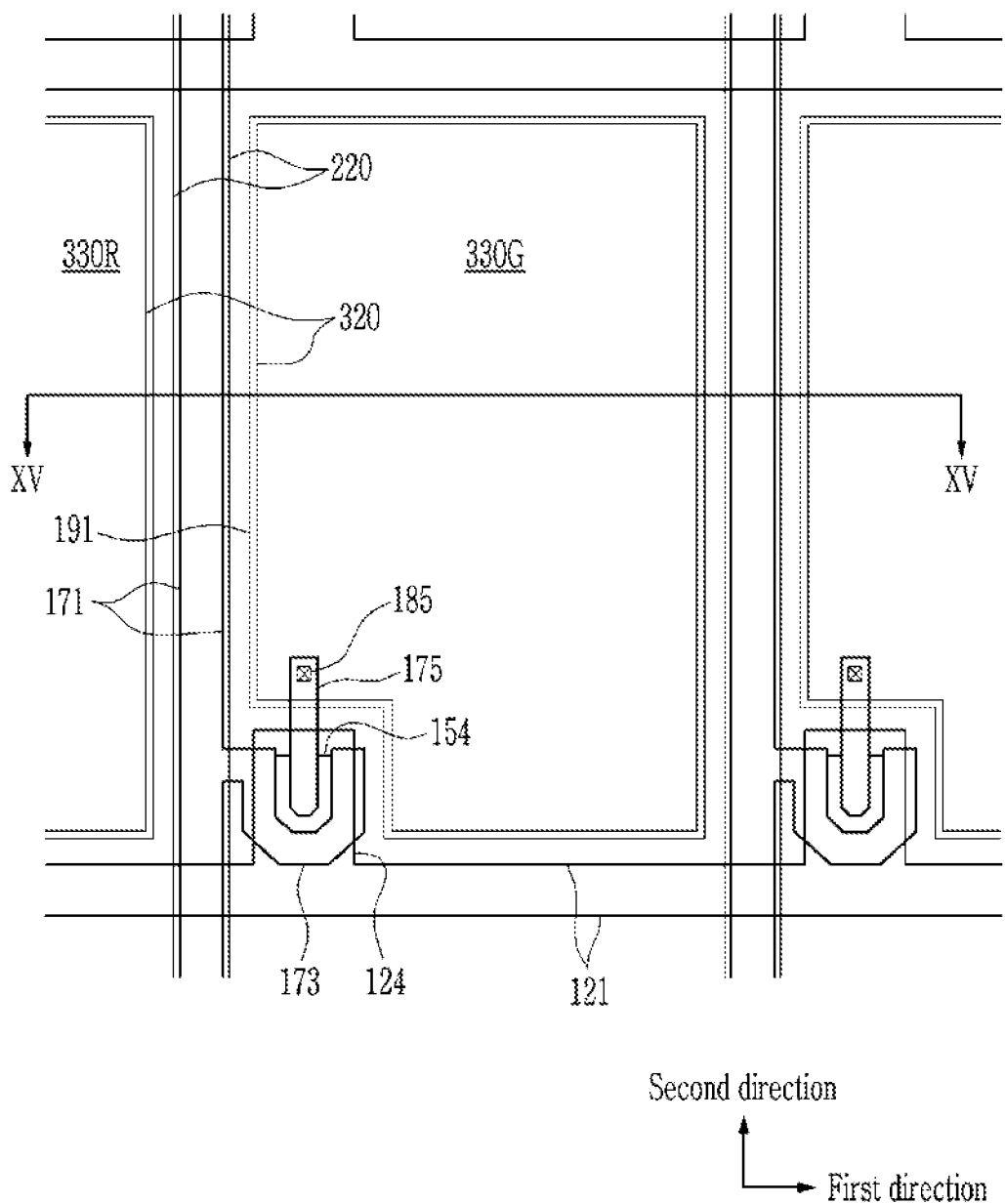
FIG. 16 is a layout view of a display device according to an exemplary embodiment of the present invention.

FIG. 16 is a layout view of a display device according to an exemplary embodiment of the present invention. FIG. 17 is a cross-sectional view taken along a line XV-XV of FIG. 16.

Figure 17:
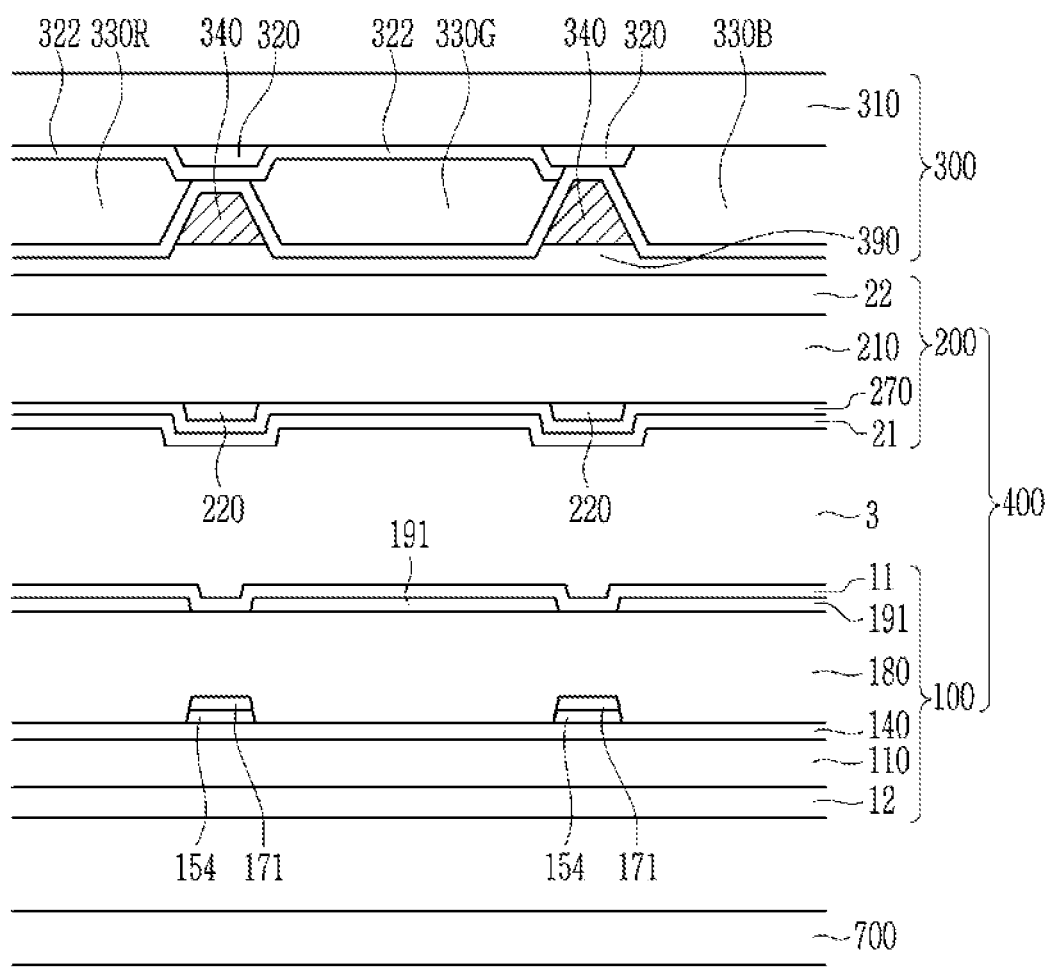
FIG. 17 is a cross-sectional view taken along a line XV-XV of FIG. 16.

Referring to FIG. 16 and FIG. 17, the display device may include the display panel 400 and the color conversion panel 300. The display device may further includes a light unit 700 providing light to the display panel 400 and the color conversion panel 300. The light unit 700 may emit blue light, and may include a blue light emitting diode (LED). Light output by the tight unit 700 may sequentially transmit through the display panel 400 and the color conversion panel 300 and the light may then be output from the display device.

The display panel 400 may include the first display panel 100, the second display panel 200 overlapping the first display panel 100 (e.g., along a direction orthogonal to an upper surface of the first display panel 100), and the liquid crystal layer 3 provided between the first display panel 100 and the second display panel 200.

The first display panel 100 will be described in more detail below. A gate conductor including a gate line 121 and a gate electrode 124 may be provided on one side of a first substrate 110 including transparent glass or plastic, and a first polarization layer 12 may be provided on another side of the first substrate 110.

The gate line 121 may extend in a first direction. The gate conductor may include at least one metal or at least one conductor. The gate conductor may have a multilayered structure.

A gate insulating layer 140 may be provided between the gate conductor and the liquid crystal layer 3. The gate insulating layer 140 may include an inorganic insulating material.

A semiconductor layer 154 may be provided on one side of the gate insulating layer 140.

A data line 171 may be provided between the semiconductor layer 154 and the liquid crystal layer 3, and may extend in a second direction to traverse the gate line 121. A source electrode 173 may extend from the data line 171 and may overlap the gate electrode 124. A drain electrode 175 may be separated from the data line 171 (see, e.g., FIG. 16), and may have a bar shape extending toward a center of the source electrode 173.

Part of the semiconductor layer 154 need not overlap the data line 171 and the drain electrode 175 in a region provided between the source electrode 173 and the drain electrode 175. The semiconductor layer 154 may have substantially the same planar form as the data line 171 and the drain electrode 175 except for a non-overlapping portion.

One gate electrode 124, one source electrode 173, and one drain electrode 175 may be included in one thin film transistor together with the semiconductor layer 154, and a channel of the thin film transistor represents a region of the semiconductor layer 154 between the source electrode 173 and the drain electrode 175.

A passivation layer 180 may be provided among the source electrode 173, the drain electrode 175, and the liquid crystal layer 3

The passivation layer 180 may include an inorganic insulating material such as a silicon nitride or a silicon oxide, an organic insulating material, or a low dielectric insulating material.

The passivation layer 180 may include a contact hole 185 overlapping part of the drain electrode 175.

A first electrode 191 may be provided between the passivation layer 180 and the liquid crystal layer 3. The first electrode 191 may be physically and electrically connected to the drain electrode 175 through the contact hole 185, and may receive a data voltage from the drain electrode 175. The first electrode 191 may be a pixel electrode.

A first alignment layer 11 may be provided between the first electrode 191 and the liquid crystal layer 3.

The second display panel 200 may include a second substrate 210, a light blocking member 220, a second electrode 270, a second alignment layer 21, and a second polarization layer 22.

The second polarization layer 22 may be provided on one side of the second substrate 210, and the second electrode 270 may be provided on another side thereof. The second electrode 270 may be a common electrode.

The second polarization layer 22 may include a plurality of fine lines arranged at regular intervals, and the fine lines may include a metal. However, without being limited thereto, the second polarization layer 22 may have other forms such as a coating-type polarization layer.

The light blocking member 220 may be provided between the second substrate 210 and the second electrode 270. The light blocking member 220 may overlap the data line 171 and may extend in the second direction. The light blocking member may further include a horizontal unit overlapping the gate line 121 and extending in the first direction.

The second alignment layer 21 may be provided between the second electrode 270 and the liquid crystal layer 3.

The color conversion panel 300 is described in more detail below. The color conversion panel 300 may include the substrate 310, the first color conversion layer 330R, the second color conversion layer 330G, the transmission layer 330B, and the scatterer layer 340. Descriptions of constituent elements that are the same or substantially similar to those described above may be omitted below. As an example, the color conversion panel 300 may have a configuration according to an exemplary embodiment of the present invention, as described in more detail above with reference to FIG. 1 to FIG. 9.

The display device according to an exemplary embodiment of the present invention may include a color conversion panel, and the color conversion panel may include the scatterer layer 340 provided between the neighboring color conversion layers or the transmission layers, or the inner scattering layer 341 provided on the side of the color conversion layer or the transmission layer, thus preventing the mixture of colors between the neighboring color conversion layers or the transmission layers. The display device according to an exemplary embodiment of the present invention may include a reflection layer or a light filter layer, thus increasing the light outputting efficiency.

While the present invention has been shown and described with reference to the exemplary embodiments thereof, it will be apparent to those of ordinary skill in the art that various changes in form and detail may be made thereto without departing from the spirit and scope of the present invention.

What is claimed is:

1. A color conversion panel comprising:
a substrate;
a first color conversion layer, a second color conversion layer, and a transmission layer provided on the substrate;
a first scatterer layer provided between the first color conversion layer and the second color conversion layer, and a second scatterer layer provided between the second color conversion layer and the transmission layer;
a light blocking member disposed on the substrate; and
a blue light cutting filter disposed on the substrate, and overlapping the first color conversion layer and the second color conversion layer along a direction orthogonal to an upper surface of the substrate,
wherein a part of the blue light cutting filter is overlapped by the light blocking member along a direction orthogonal to an upper surface of the substrate.

2. The color conversion panel of claim 1, further comprising
a reflection layer provided between at least one of the first or second scatterer layers and at least one of the first color conversion layer, the second color conversion layer, or the transmission layer.

3. The color conversion panel of claim 2, wherein
the reflection layer is provided on at least one side of the first color conversion layer, the second color conversion layer, or the transmission layer, and wherein the reflection layer is not provided on an upper side of the first color conversion layer, the second color conversion layer, or the transmission layer opposite the substrate.

4. The color conversion panel of claim 2, further comprising
an inner light filter layer provided between the reflection layer and at least one of the first color conversion layer, the second color conversion layer, or the transmission layer.

5. The color conversion panel of claim 1, further comprising
a light filter layer provided between the first scatterer layer and the first color conversion layer, between the first scatterer layer and the second color conversion layer, between the second scatterer layer and the second color conversion layer, and between the second scatterer layer and the transmission layer.

6. The color conversion panel of claim 1, wherein
the first and second scatterer layers each include at least one of TiO2, ZrO2, HfO2, Ta2O5, Y2O3, or ZnO.

7. A color conversion panel comprising:
a substrate;
a first color conversion layer, a second color conversion layer, and a transmission layer disposed on the substrate;
a first scatterer layer disposed between the first color conversion layer and the second color conversion layer, and a second scatterer layer disposed between the second color conversion layer and the transmission layer;
a light blocking member disposed on the substrate; and
a blue light cutting filter disposed on the substrate, and overlapping the first color conversion layer and the second color conversion layer along a direction orthogonal to an upper surface of the substrate,
wherein a part of the blue light cutting filter is overlapped by the light blocking member along a direction orthogonal to an upper surface of the substrate.

8. A color conversion panel comprising:
a substrate;
a first color conversion layer, a second color conversion layer, and a transmission layer disposed on the substrate;
a first scatterer layer disposed between the first color conversion layer and the second color conversion layer, and a second scatterer layer disposed between the second color conversion layer and the transmission layer;
a light blocking member disposed on the substrate; and
a blue light cutting filter disposed on the substrate, and overlapping the first color conversion layer and the second color conversion layer along a direction orthogonal to an upper surface of the substrate, wherein the blue light cutting filter absorbs light in a wavelength band from 400 nm to 500 nm,
wherein a part of the blue light cutting filter is overlapped by the light blocking member along a direction orthogonal to an upper surface of the substrate.

* * * * *